United States Patent [19]

Kobayashi

[11] Patent Number: 5,068,768

[45] Date of Patent: Nov. 26, 1991

[54] VARIABLE LIGHT DISTRIBUTION TYPE AUTOMOBILE LAMP

[75] Inventor: Syoji Kobayashi, Shizuoka, Japan

[73] Assignee: Koito Manufacturing Co., Ltd., Tokyo, Japan

[21] Appl. No.: 674,996

[22] Filed: Mar. 26, 1991

[30] Foreign Application Priority Data

Mar. 28, 1990 [JP] Japan .............................. 2-31135[U]
Mar. 28, 1990 [JP] Japan .............................. 2-31136[U]

[51] Int. Cl.$^5$ ............................................. B60Q 1/04

[52] U.S. Cl. ..................................... 362/61; 362/277; 362/268; 362/319; 362/331

[58] Field of Search .................. 362/61, 80, 277, 268, 362/305, 307, 310, 319, 308, 331

[56] References Cited

U.S. PATENT DOCUMENTS

| | | | |
|---|---|---|---|
| 3,522,424 | 8/1970 | Fritsch | 362/268 |
| 4,293,892 | 10/1981 | Plummer | 362/268 X |
| 4,345,303 | 8/1982 | Gerard et al. | 362/268 X |
| 4,739,456 | 4/1988 | Little | 362/268 |
| 4,771,372 | 9/1988 | Litetar et al. | 362/307 |

*Primary Examiner*—Stephen F. Husar
*Attorney, Agent, or Firm*—Sughrue, Mion, Zinn Macpeak & Seas

[57] ABSTRACT

A variable light distribution type automobile lamp capable of varying the range of diffusion of a flux of light by changing the position of one of two cylindrical lenses. Flat areas are formed at the centers of both lenses to produce a spot beam at the center of the ouput light flux. The lenses are aligned with one another using this spot beam. The invention also provides a device for varying the distance between the lenses in the direction of the optical axis without rotating the lenses relative to one another.

21 Claims, 12 Drawing Sheets

VARIABLE LIGHT DISTRIBUTION TYPE AUTOMOBILE LAMP

BACKGROUND OF THE INVENTION

The present invention relates to a variable light distribution type automobile lamp, such as a fog lamp, capable of varying the range of diffusion of a flux of light by changing the position of one of two cylindrical lenses.

As shown in FIGS. 1(*a*) and 1(*b*), variable light distribution type automotive lamps have been provided with two lenses 50 and 51 disposed on the optical axis in the path of a flux of parallel light rays. The lenses 50 and 51, which have cylindrical lens steps formed at the same pitch, vary the light distribution pattern of the flux of irradiating light either by converging or diffusing the light rays, as shown in FIG. 2. A flux of irradiated parallel light rays (FIG. 1(*a*)) is formed by bringing the focuses F1 and F2 of the lens steps of the two lenses 50 and 51 into agreement by moving one of the two lenses 50 and 51 in the direction of the optical axis (i.e., the direction indicated by the arrow A), while a flux of diverging light rays (FIG. 1(*b*)) is formed by spacing the focus F1 and the focus F2 from one another.

However, in a lamp having such a lens system, deviation of the two lenses 50 and 51 having many cylindrical lens steps in the direction of pitch (i.e., in a direction perpendicular to the optical axis), as shown in FIG. 1(*c*), causes a deflection of the main flux of light S towards the side area in relation to the optical axis L. It is therefore necessary to adjust the two cylindrical lenses in the course of the assembly of the lamp to eliminate such a deviation of the lenses in the pitch direction.

On the other hand, if the flux of light is, for example, in a diverging state, the direction of the main flux of light cannot be determined, and, consequently, there is no flux of light that can serve as the reference. Hence, the adjustment of the lenses 50 and 51 not only requires a high degree of skill, but also the adjustment requires a great amount of time. Moreover, the driving mechanism for the lens system requires measures such as the provision of a correcting mechanism for preventing the cylindrical lens from deviating in the horizontal direction when the cylindrical lens on the light source side is driven. This presents such problems as complication of the overall structure of the lamp.

The present invention further relates to improvements in a driving device for a variable light distribution type automotive lamp capable of varying the range of diffusion of a flux of light in accordance with the speed of the vehicle.

A conventional variable light distribution type automobile lamp is known which is provided with two cylindrical lenses disposed on the optical axis forward of a parallel light flux irradiating device and which performs variable control over the light distribution pattern by converging or diffusing the flux of light passing through the lens in accordance with the vehicle speed by changing the relationship of the two lenses in terms of the positions of their focuses by controlling the movement of one of the lenses in the direction of the optical axis. This type of automobile lamp, which can thus produce a favorable distribution of light suitable for various operating conditions, has made an important contribution to safety in the operation of motor vehicles.

However, in this type of lamps, the two lenses are formed lo with many cylindrical lens steps formed side by side in order to diffuse the flux of light rightward and leftward. Hence, if the two lenses deviate in the lateral direction from their proper positions, the flux of light is caused to deflect rightward or leftward. Thus, a precise construction is required to ensure accuracy in the correspondence of the individual lens steps on the two lenses. This not only results in a complicated construction, but also requires a high degree of skill and a large amount of time for the assembly and adjustment of the lamp.

SUMMARY OF THE INVENTION

The present invention has been made in consideration of the problems described hereinabove, and an object thereof is to provide a variable light distribution type automobile lamp which is provided with two lenses having cylindrical lens steps at the same pitch on the optical axis and which is disposed in a flux of parallel light and forms a light distribution pattern of a flux of light diffused or converged by moving one of the two lenses in the direction of the optical axis which is capable of forming a flux of spot light extending along the optical axis in the flux of light which passes through the two lenses.

Another object of the invention is to provide such a variable light distribution type automobile lamp in which there is no deviation in the pitch direction when the lens on the light source side is driven, even though the lamp is not provided with any special correcting mechanism or the like.

In order to attain the objects described above, the invention provides a variable light distribution type automobile lamp which varies the range of diffusion of a flux of light by driving one of two lenses having cylindrical lens steps provided on the optical axis forward of the flux of parallel light, and further which lens system is so constructed that a flat area is formed on the lens steps in the center of the two lenses and a spot light irradiating part is thereby formed for the passage of the above-mentioned flux of parallel light in parallel with the optical axis.

Further in accordance with the present invention there is provided a variable light distribution type automobile lamp which varies the range of diffusion of a flux of light by driving one of two lenses having cylindrical lens steps provided on the optical axis forward of the flux of parallel light, which lamp is provided with a lens system driving mechanism so constructed that two frames provided inside the lamp body are inserted interconnected with one another in such a manner as to permit the free sliding movement of the frames in the direction of the optical axis, with the first lens on the light source side being rigidly fixed on the first frame on the inner side and the second lens being rigidly fixed on the above-mentioned second frame. The second frame is constructed in a shape in approximate agreement with the shape of the second lens. A relative displacement driving means operating in the axial direction is provided between the first frame and the second frame inside the lamp body, so that the position of the sliding movement of the first frame on the inner surface of the second frame may be controlled freely by the relative displacement driving means.

Thus, with the construction of the lens system described above, the relationship between the positions of the focuses of the lens steps formed on the two lenses results in: (1) the production of a flux of parallel irradiated light converging as the focuses of the lens steps of the two lenses are brought into agreement, and (2) the production of a flux of irradiated light diffusing as the focuses of the lens steps of the two lenses are moved out of agreement.

In this regard, flat areas are formed on the respective lens steps in the centers of the two lenses, and a spot light irradiating part is formed for the passage of a flux of parallel light in parallel with the optical axis. Therefore, the flux of spot light which passes through the spot light irradiating part is: (1) irradiated in parallel with the optical axis, regardless of the interval between the two lenses, and (2) irradiated in parallel with the optical axis, even if the two lenses are deviated in the direction of the lens steps, whereby a spot area is always properly formed in the light distribution pattern.

Therefore, it is possible to adjust the aiming angle of the lamp body or to make adjustment for correction of a deviation between the positions of the two lenses using the above-mentioned flux of spot light as the reference.

Moreover, with the construction of the above-mentioned driving device for the lens system in which the second frame is constructed in a shape in approximate agreement with the shape of the second lens, the first lens cannot rotate around the optical axis in relation to the second lens, and hence no deviation in position will occur as the result of relative rotation of the two lenses. Also, as both of these lenses are constructed so that they are fixed directly on the first frame and the second frame, respectively, it is made possible to adjust the offset between the two lenses in the pitch direction and also to provide a construction in which the first frame performs its sliding motion as inserted internally in the second frame. Thus, since no deviation will occur in the pitch direction even if the lens on the light source side is driven, the main optical axis of the flux of passing light is not deflected towards the side. As a result, the flux of irradiated light is stabilized.

Another object of the invention is the provision of a lens driving device for a variable light distribution type automobile lamp which is simple in construction and yet capable of driving one of the lenses accurately to shift its position along the optical axis.

In order to attain the object described above, the lens driving device of present invention for use in a variable light distribution type automobile lamp having a variable range for the diffusion of a flux of light by driving one of two lenses, each having cylindrical lens steps provided on the optical axis forward of a parallel light flux irradiating means, features a lens driving device which is characterized by having a construction wherein a sliding ring and a rotating ring are inserted internally and externally into a cylindrical guide barrel provided on the optical axis forward of the parallel light flux irradiating means, a pin shaft provided in the form of a protrusion on the sliding ring rigidly mounted with a movable lens formed into cylindrical lens steps formed side by side in the width direction is linked with a guide slot formed in the guide barrel and extending in the direction of the optical axis and a helicoidal slot formed in the cylindrical wall of the rotating ring in a manner permitting their respective free sliding movement only in the direction of the slot, a stationary lens provided with cylindrical lens steps formed side by side in the same direction and at the same pitch as the movable lens is fixed rigidly directly or indirectly on the forward end of the guide barrel, the rotating ring is appropriately connected for rotating motion with a controlling and driving means, such as a DC motor, by way of a rotation transmitting mechanism, and the rotational displacement is detected with a potentiometer.

With the construction described above, the rotating ring rotates around the guide cylinder when a controlling and driving means, such as a DC motor, is driven for forward or reverse rotation. At such a time, the pin shaft is engaged in the helicoidal slot in the rotating ring, and at the same time it is engaged in the guide slot in a manner permitting free sliding movement in the direction of the slot. Therefore, the sliding ring in which the two pin shafts are set moves parallel to the optical axis. By such movement and displacement, the distance between the movable lens mounted in the above-mentioned sliding ring and the stationary lens is changed, and, by the resulting change in the positional relationship of the convex lens steps on the two lenses, the pattern of the flux of irradiated light is changed.

BRIEF DESCRIPTION OF THE DRAWINGS

The manner by which the above objects and other objects, features and advantages of the present invention are attained will be fully evident from the following detailed description when considered in light of the drawings, wherein.

DESCRIPTION OF THE PREFERRED EMBODIMENTS

Figure 1A:
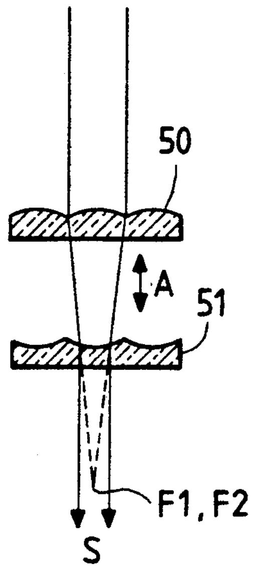
FIGS. 1(*a*)-1(*c*) are illustrative drawings showing a conventional lens systems.
Figure 1B:
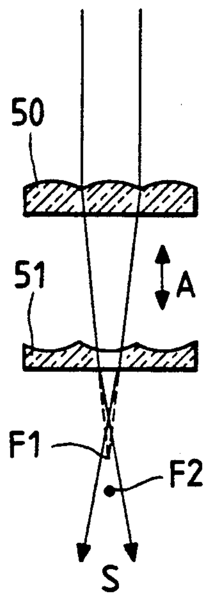
Figure 1C:
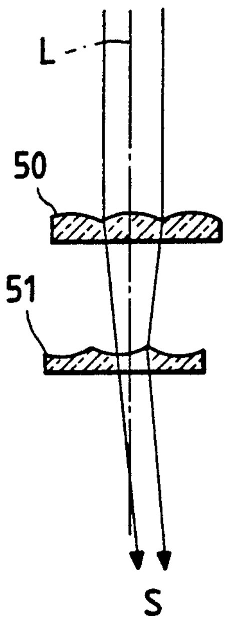
Figure 2:
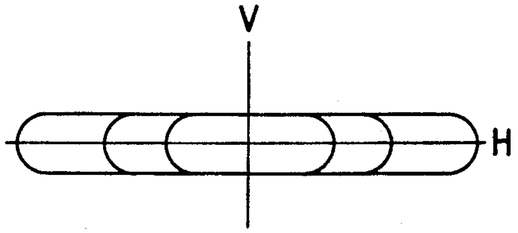
FIG. 2 is an illustrative drawing showing the light irradiating patterns of the same conventional lens systems.
Figure 3:
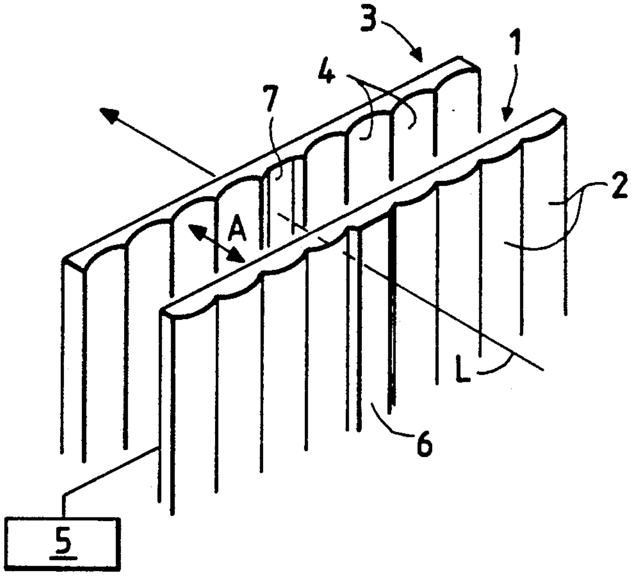
FIG. 3 is an oblique perspective view illustrating the principles of a lens system of a variable light distribution type automobile lamp according to the present invention.
Figure 4A:
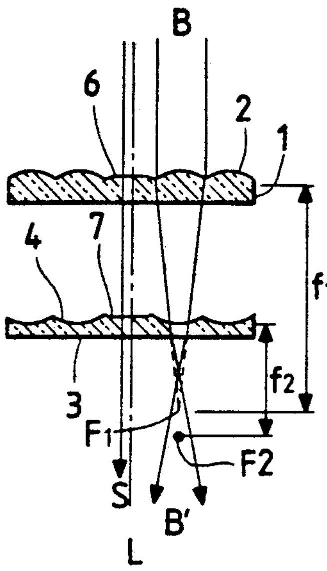
FIGS. 4(*a*) and 4(*b*) are illustrative drawings showing the relationship between the positions of the lenses and the flux of light.
Figure 4B:
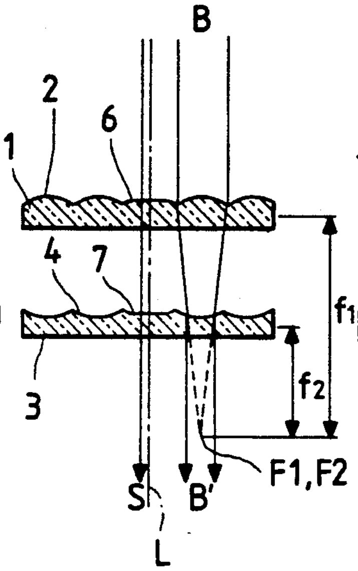
Figure 4C:
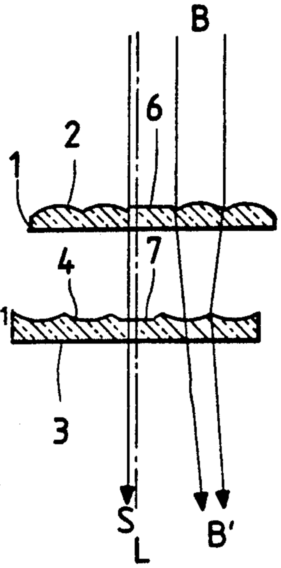
Figure 5A:
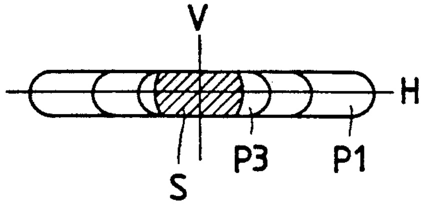
FIGS. 5(*a*)-5(*c*) are illustrative drawings showing the irradiating patters produced by the lens system.
Figure 5B:
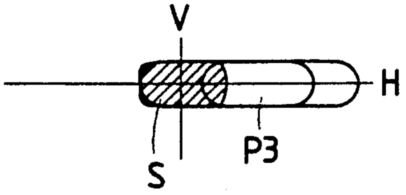
Figure 6:
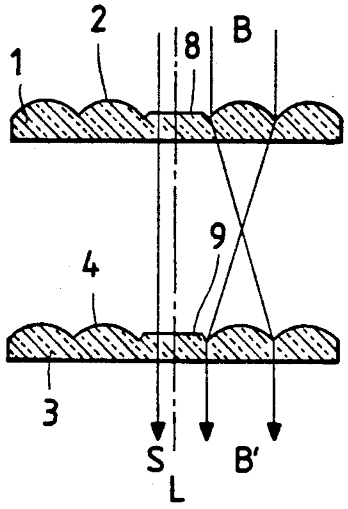
FIG. 6 illustrates another lens system.

Preferred embodiments of the variable light distribution type automobile lamp according to the present invention will now be described with reference to the accompanying drawings FIG. 3 through FIG. 5 are principle drawings illustrating the lens system in a variable light distribution type automobile lamp constructed according to the present invention.

On the optical axis L forward of the parallel light flux B are mounted a first lens 1, on which a plural number of cylindrical convex lens steps 2 are formed, and a second lens 3, on which cylindrical concave lens steps 4 are formed at the same pitch and extending in the same direction as the first lens 1. One of the lenses (the first lens 1 in the case of the constructicn shown in these figures) is set in a frame structure in such a manner as to permit control over its displacement in the direction of the optical axis L (i.e., in the direction marked by an arrow A) by way of an axial direction relative position driving device 5.

The cylindrical convex lens steps 2 on the above-described first lens, which have respective focal lengths f1 (focuses F1) and have a flat area 6 crossing at right angles with the optical axis L, are formed on the top part of the lens step in the center of the first lens. The cylindrical concave lens steps 4 on the above-mentioned second lens 3, which have respective focal lengths f2 (focuses F2) and a flat area 7 crossing at right angles with the optical axis L, are formed on the lens step in the center of the second lens 4.

Thus, the lens system described above shifts the position of the first lens 1 in the direction of the optical axis by the action of the axial direction relative position driving device, thereby producing a flux of diffused light and a flux of spot light, as illustrated in FIGS. 4(*a*) and 4(*b*).

FIG. 4(*a*) shows the positions of the focuses F1 and F2 of the two lenses 1 and 3 deviating in the direction of the optical axis L, while the parallel light flux B incident upon the lens step 2 of the first lens 1 does not converge towards the focus F2 on the lens step 4 of the second lens 3, with the result that the flux of light B, which has passed through the second lens 3 becomes a flux of diffused light and forms a diffused irradiating pattern P1, as shown in FIG. 5(*a*).

Also, FIG. 5(*b*) shows the positions of the focuses F1 and F2 of the two lenses 1 and 3 in the state where they overlap, wherein the parallel light flux B incident upon the lens step 2 of the first lens 1 converges towards the focus F2 of the lens step 4 of the second lens 3, with the result that the flux of light B′ which has passed through the second lens 3 becomes a flux of converged parallel light and forms a diffused irradiating pattern P3, as shown in FIG. 5(*a*).

The flux of light S which has passed through the flat areas formed on the lens steps 2 and 4 in the centers of the first lens 1 and the second lens 3 is irradiated in parallel with the optical axis, regardless of the positions of the two lenses 1 and 3, and consequently forms a spot irradiated area indicated by the mark S in FIG. 5(*a*). The position of this spot-irradiated area S will remain the same, even in case a relative deviation has occurred in the positions of the first lens 1 and the second lens 3 in the pitch direction of the lens steps 2 and 4, as shown in FIG. 4(*c*), and, even if the flux of irradiated light is deflected in the rightward-leftward direction, the spot irradiated area S remains on the position on the optical axis L, as shown in FIG. 5(*b*).

Therefore, it is possible to perform the adjustment of the aiming angle of the lamp at the time of assembly of the lamp and to make the adjustment of the positions of the two lenses 1 and 3 with reference to the spot irradiated area S.

As described above, the first lens 1 and the second lens 3 are provided with the lens steps 2 and 4 which are constructed by a combination of a cylindrical convex lens and a cylindrical concave lens, but it goes without saying that the same spot-irradiated area can be formed in the irradiating pattern by the formation of flat areas 8 and 9 on the top part of the lens steps in the center of first and second lenses constructed by a combination of lens steps 2 and 4 on a cylindrical convex lens and another cylindrical convex lens.

Next, a description will be given of the driving device for the lens system of the variable light distribution type automobile headlamp according to the present invention.

Figure 7:
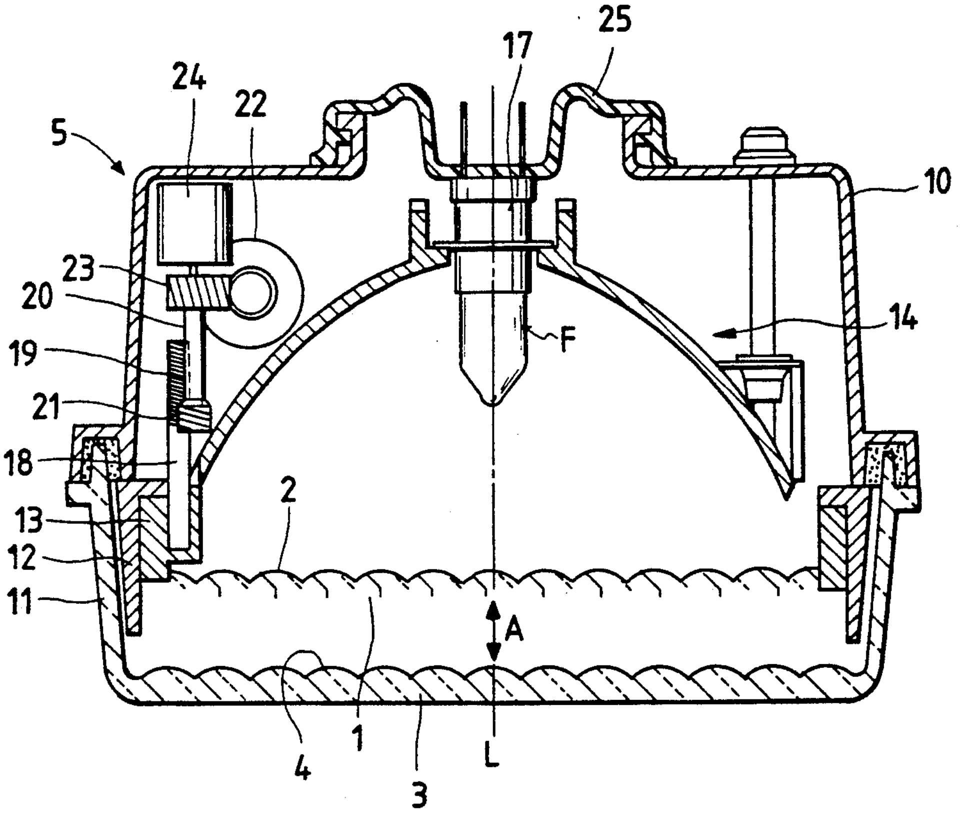
FIG. 7 is a plane sectional view illustrating a first preferred embodiment of a lens system driving device in a variable light distribution type automobile lamp according to the present invention.
Figure 8:
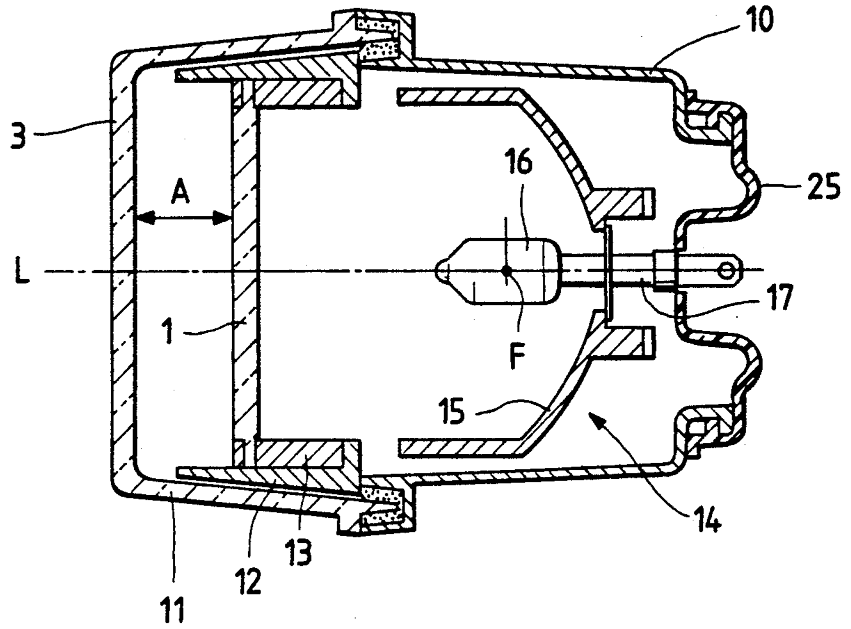
FIG. 8 is an abbreviated side sectional view of the same lens system driving device.
Figure 9:
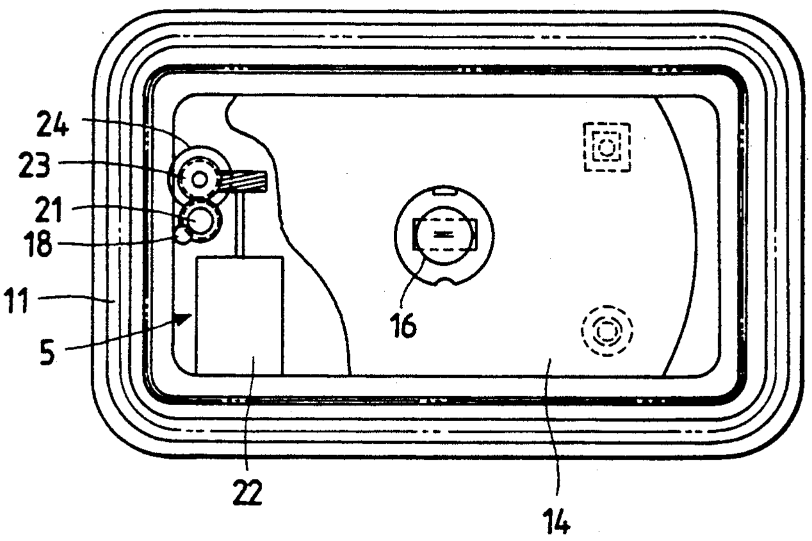
FIG. 9 is an abbreviated front sectional view of the reflector of the lamp of FIG. 7 with some parts illustrated in cut-away.

FIG. 7 through FIG. 9 illustrate a preferred embodiment of a driving device of the invention. The leg parts of the front lens 11 with a second lens 3 formed thereon are set and clamped in a rectangular opening formed in the front area of a casing 10. A second frame 12, which is a cylindrical body forming an approximately identical rectangular shape to that of the leg parts of the front lens 11 in which the above-mentioned second lens 3 is formed, is rigidly set in the inner surface of the opening of the casing 10. A first frame 13 having a cylindrical shape is inserted within this second frame 12 in a manner permitting the free sliding movement of the first frame 13 in the direction of the optical axis L. A first lens 1 is mounted rigidly on the first frame 13. The first lens 1 and the second lens 3 contain cylindrical convex lens steps 2 and 4 formed at the same pitch. Corresponding ones of the lens steps 2 and 4 are arranged on common optical axes extending parallel to the optical axis L.

Reference number 14 indicates a reflector in the rear area on the optical axis L for the first lens 1. A bulb socket 17 is set rigidly in the rear end of the casing 10 in such a manner that the filament of the bulb 16 is positioned at the focus F of the parabolic reflector surface 15 of the reflector 14. Reference number 18 indicates a lens driving shaft extending parallel to the optical axis L at the rear end of the first frame 13. A rack 19 formed on the lens driving shaft 18 and extending in the axial direction is in threaded engagement with a worm gear 21 on one end of an intermediate shaft 20. The intermediate shaft 20 is rotatively connected to the driving shaft of a lens driving DC motor 22 by way of a bevel gear 23.

Thus, in response to forward and reverse rotation of the lens driving DC motor 22, the bevel gear 23, the intermediate shaft 20, and the worm gear 21 are rotated, and the lens driving shaft 18 is displaced in the direction indicated by the arrow A by the action of the rack 19 meshing with the worm gear 21. With this displacement (in the direction of the arrow A), the first frame 13 slides in the direction of the optical axis L on the inner surface of the second frame 12, and the first lens 1 is shifted accurately without changing the relative positions of the cylindrical lens steps 2 and 4 in relation to the second lens 3 to change the displacement between the two lenses 1 and 3.

In addition, a potentiometer 24 is connected so as to be rotated by the intermediate shaft 20. By setting in advance the relation between the rotational position of the intermediate shaft 20 and the distance between the two lenses, it is possible to perform controlled driving of the lens driving DC motor 22 with a central control circuit (not illustrated) operating in response to position signals from the potentiometer 24.

Reference number 25 indicates a waterproof cover which covers the rear end of the bulb socket 17.

Figure 10:
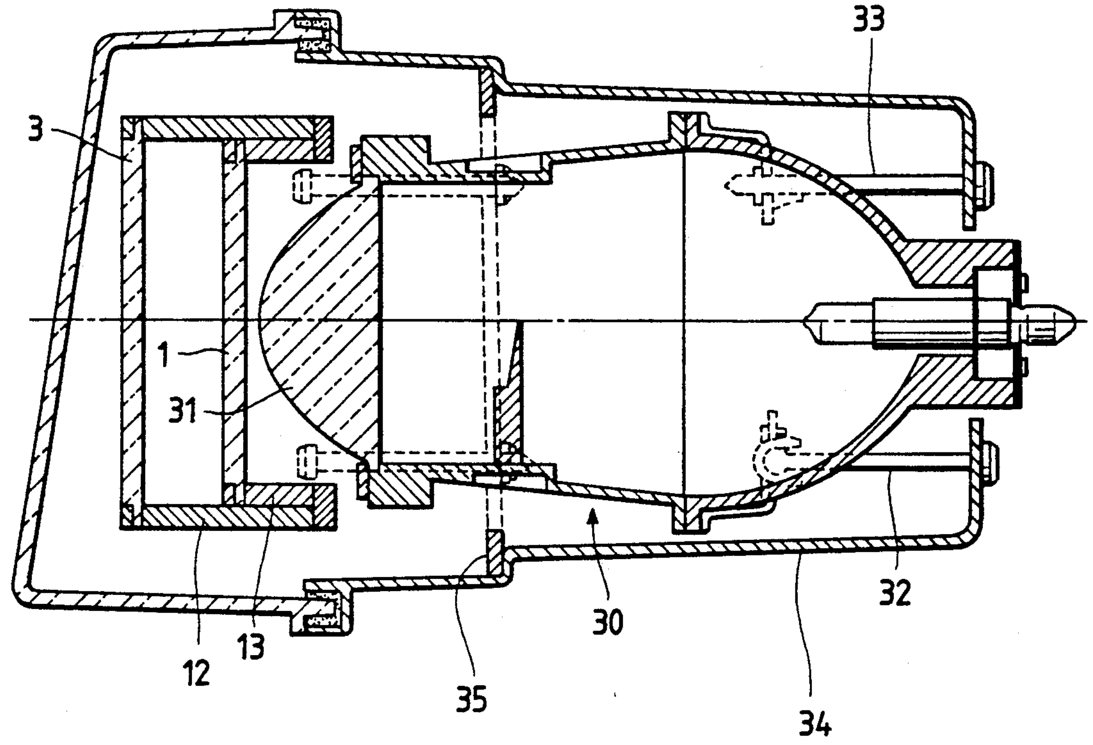
FIG. 10 is a side sectional view illustrating a second preferred embodiment of a lens system driving device for a variable light distribution type automobile lamp according to the present invention.
Figure 11:
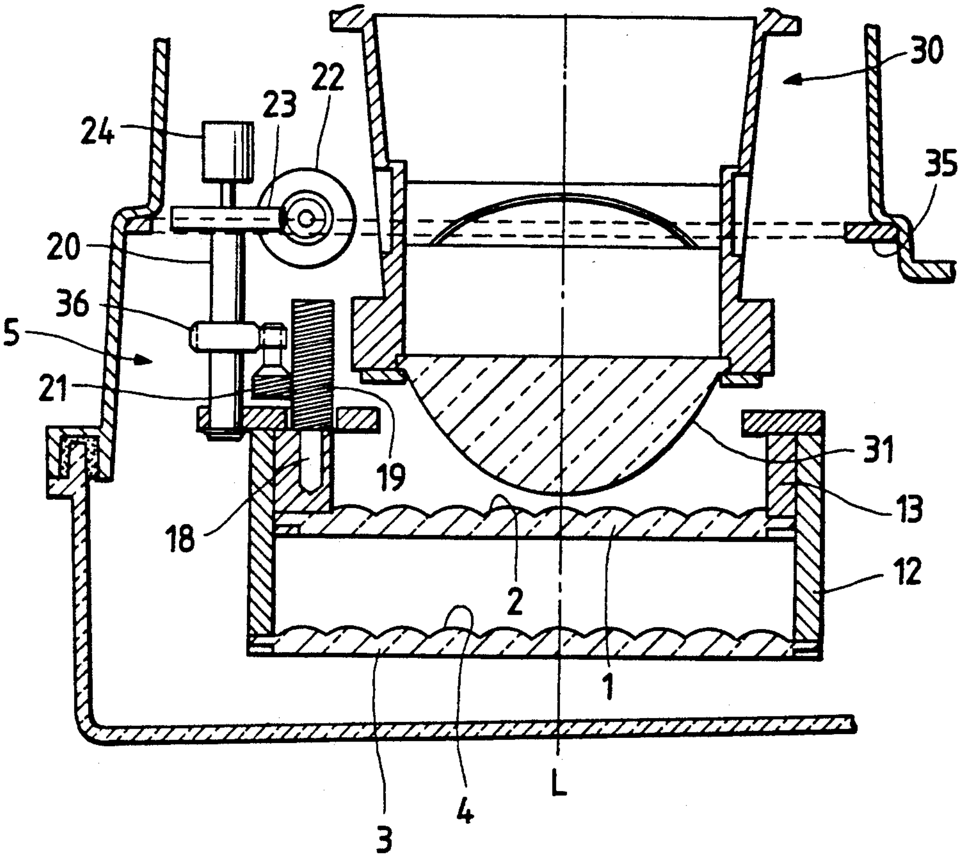
FIG. 11 is a plane sectional view showing principal parts of the same lens system driving device.
Figure 12:
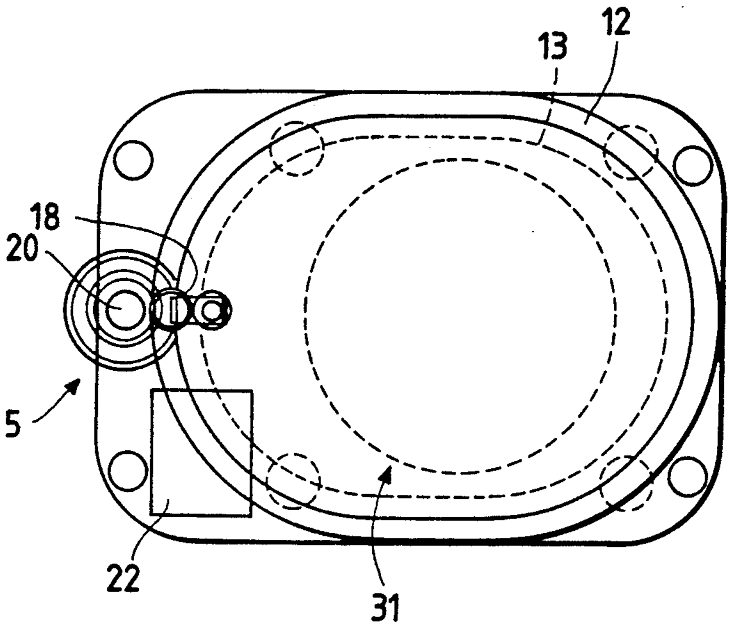
FIG. 12 is a front view of the lens driving part.

FIG. 10 through FIG. 12 illustrate a lamp in which a projector lamp 30 is employed as a light source to provide a flux of parallel light. The projector lamp 30 with a collimator lens 31 set on its forward end is mounted in a frame structure on a casing 34 by way of an aiming mechanism composed of a supporting rod 32 and an adjusting screw 33. A first lens 1 and a second lens 3, which are provided on the optical axis forward of the projector lamp 30, are set rigidly on a second frame 12, which is clamped and fixed on a mounting plate 35 rigidly fixed in a casing 34. A first frame 13 is inserted within the second frame 12. The lenses 1 and 3 are formed with cylindrical lens steps 2 and 4, in the same manner as in the first embodiment described above. The driving device 5 is basically the same in construction as that of the first embodiment described above. A worm gear 21, driven by an intermediate gear 36, drives an axially slidable rack 19, which is engaged with a lens driving shaft 18 extending parallel to the optical axis L, on the rear end of the first frame 12. An intermediate shaft 20 is mounted on a mounting plate 35. The driving shaft of a lens driving DC motor 22 and the intermediate shaft 20 are rotationally connected by a bevel gear 23, and a potentiometer 24 is rotationally connected with the other end of the intermediate shaft 20.

Figure 13:
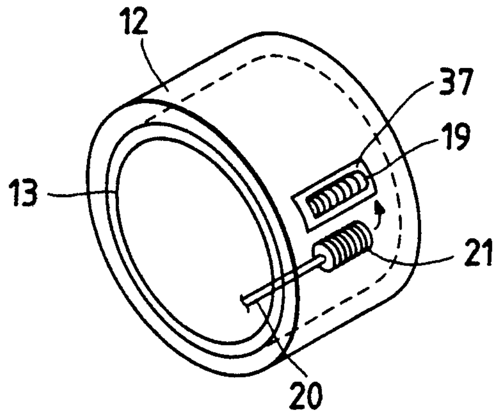
FIG. 13 is an oblique perspective view illustrating the principal parts of a third preferred embodiment of a lens driving mechanism of the invention.

FIG. 13 illustrates a construction which drives the first frame 13 for sliding movement from the outer side of the second frame 12 in the second embodiment described above. The following description relates only to those parts which are different from the second embodiment.

Specifically, a transmission hole 37, which extends in the direction of the optical axis L, is formed in the cylindrical wall of the first frame 13, and a rack 19, which is meshed with a worm gear 21, is formed on the cylindrical outer surface of the first frame 12 in a position corresponding to the transmission hole 37. The worm gear 21 is mounted on the forward end of the intermediate shaft 20 of the driving device 5. By the same action as that described earlier, the driving device 5 can change the position of the first frame 13 in relation to the second frame 12.

In the variable light distribution type automobile lamp according to the present invention constructed as described above having the second frame formed in a shape in close agreement with the shape of the second lens, the first lens cannot be rotated in relation to the second lens, and hence the two lenses will not have any deviation in their position in consequence of their relative rotation.

Moreover, as the two lenses are constructed so that they are rigidly mounted directly on the first frame and the second frame, respectively, it is possible to effect precise adjustment of the positions of the two lenses in the pitch direction. Owing to the construction of the first frame inserted in a manner permitting its sliding motion within the second frame, the driving of the lens on the light source side will not cause any deviation in the pitch direction, so that the main optical axis of the flux of passing light will not be deflected towards the side. Thus, the construction has the characteristic feature that it is capable of stabilizing the flux of irradiated light, offering an extremely great practical effect in the actual implementation of the present invention.

Further preferred embodiments of the lens driving device of the present invention will now be described.

Figure 14:
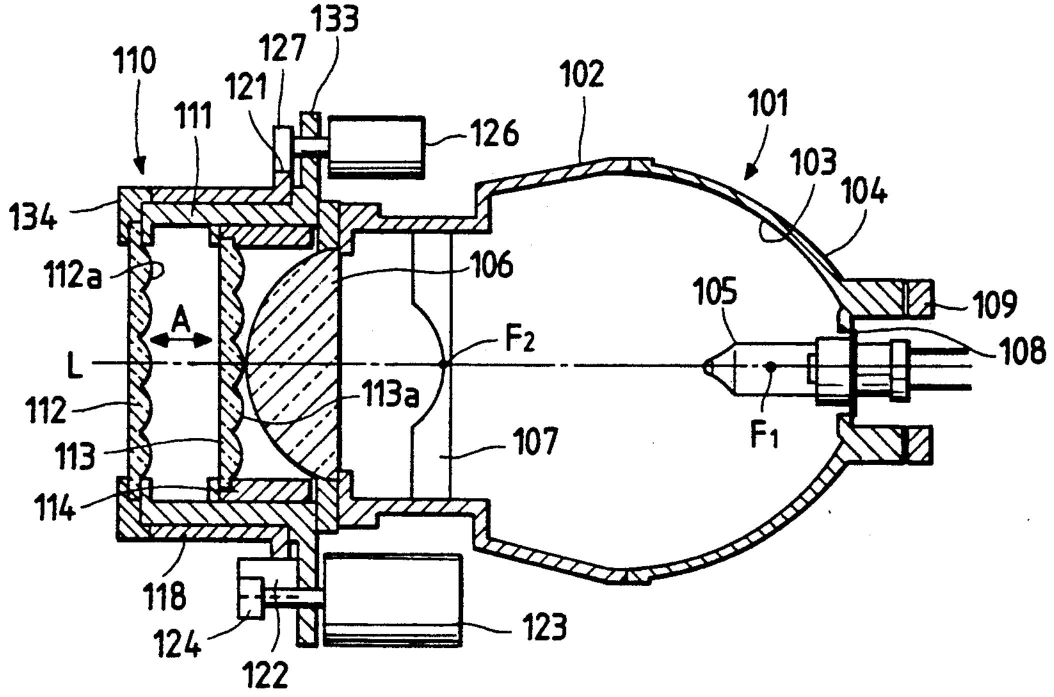
FIG. 14 is a plane sectional view illustrating a fourth preferred embodiment of a lens driving device of the present invention.
Figure 15:
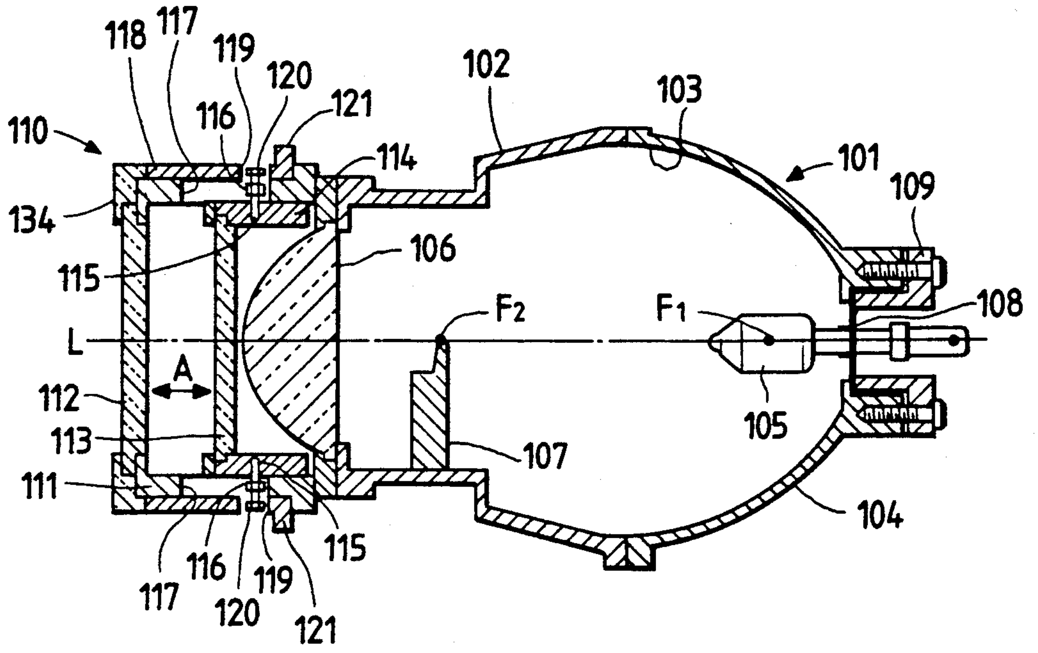
FIG. 15 is a sectional view showing the lens driving device of FIG. 14.
Figure 16:
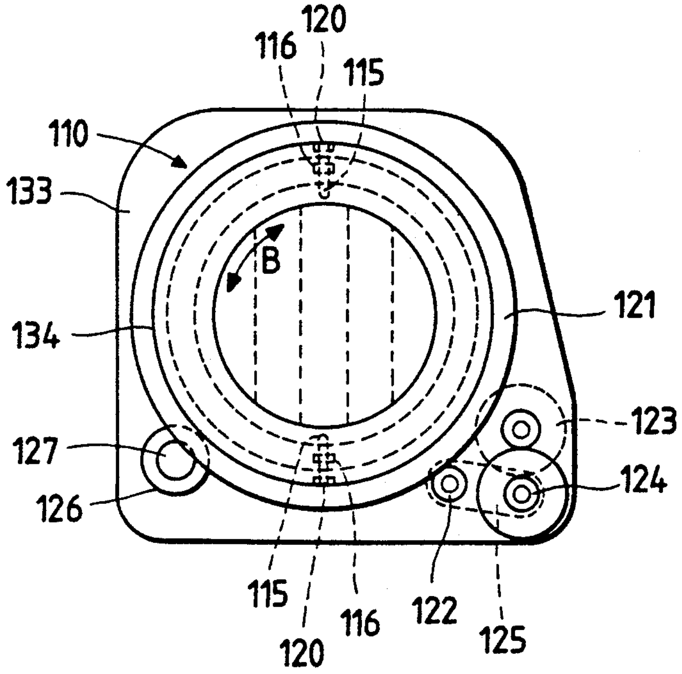
FIG. 16 is a front view of the lens driving device of FIG. 15.
Figure 17:
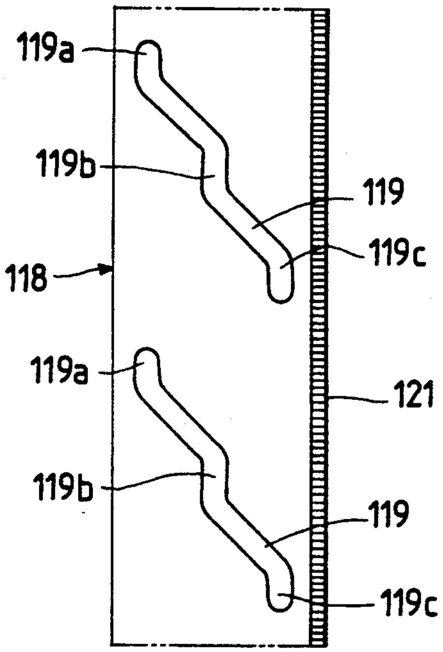
FIG. 17 is a developed drawing of a rotating ring showing helicoidal slots formed therein.

FIG. 14 through FIG. 16 illustrate a fourth preferred embodiment, in which a controlling lens system 110 is rigidly mounted on the casing 102 of a projector lamp 101, which generates a flux of parallel light. The projector lamp 101 includes a reflector 104 having an oval reflecting surface 103 (having a first focus F1 and a second focus F2) on the rear end of the casing 102, a bulb 105 mounted at the first focus F1 on the optical axis L of the reflector 104, and also a collimator lens 106 having a focus in common with the second focus F2 of the reflector 104 and rigidly mounted on the edge of the front side opening of the casing 102 on the optical axis L forward of the reflector 104. The projector lamp produces a flux of irradiated light in parallel with the optical axis L. The projector lamp is also provided with a shade 107, which, being installed in the proximity of the second focus F2, controls the pattern of the flux of parallel irradiated light.

Reference number 108 indicates a bulb supporting plate at the rear end of the reflector 104 on which the bulb 105 is mounted in a manner permitting its replacement. This bulb supporting plate is fixed with the fixing frame 109 in the opening at the rear end of reflector 104.

The above-described controlling lens system 110 is set in a frame structure in the cylindrical guide barrel 111 fixed at the forward end of the casing 102 for the projector lamp 101. The guide barrel 111 has its central axis aligned with the optical axis L. Reference number 112 indicates a stationary lens set and fixed in a lens frame 134 rigidly mounted at the forward end of the guide barrel 111. The stationary lens construction includes many cylindrical convex lens steps 112*a* (focal length f2) formed side by side. Inside this guide barrel 111 is rigidly mounted a cylindrical sliding ring 114, on which a movable lens 113 with cylindrical convex lens steps 113*a* (focal length fl) having the same pitch and extending in the same direction as the lens steps 112*a* of the stationary lens 112 formed at one end thereof is inserted in a manner permitting its free sliding motion in the axial direction (i.e., the direction marked by an arrow A). Guide rollers 116 are mounted in a manner permitting their free rotation on the middle parts of the respective pin shafts 115 fixed to the sliding ring 114. The guide rollers 116 are inserted, in a manner permitting their free sliding motion in the direction of the optical axis, in the guide slots 117 extending parallel with the optical axis L in the barrel wall of the guide barrel 111, thus forming a rotation stopping structure.

Moreover, a rotating ring 118, which is prevented from sliding in the axial direction, is fitted around, in a manner permitting its free rotation (as shown by an arrow B). Rotatable guide rollers 120 at the end parts of the pin shafts 115 are inserted, in a manner permitting their free sliding motion, in a pair of helicoidal slots 119 formed in the barrel wall. A ring gear 121 is formed on the outer circumference at the end part of the cylindrical structure. Each of the helicoidal slots 119 has positioning steps 119*a*, 119*b* and 119*c* of a predetermined width at both its ends and in its center and extending in the circumferential direction of the barrel wall. These holes are in the form of a spiral.

Reference number 122 indicates a driving gear axially mounted in a manner permitting its free rotating motion on a heteromorphic flange 133 formed by perforating the base end of the guide barrel 111. The driving gear 122 is held in engagement with the ring gear 121, which is rotatably connected, by way of a rotation transmitting mechanism composed of a speed reducing gear 124 and an endless belt 125, with the driving shaft of a DC motor 123 rigidly mounted on the heteromorphic flange 133. In addition, a potentiometer 126 is rigidly installed on the heteromorphic flange. The potentiometer 126, which has a gear 127 axially mounted on its input shaft meshed with the ring gear 121, detects the rotational position of the ring gear 121, and outputs a signal indicating this information to a control circuit (not illustrated).

In the construction described above, the ring gear 121 is rotated by way of the speed reducing gear 124, the endless belt 125, and the driving gear 122 when the DC motor 123 is driven in the forward and reverse directions, and the rotating ring 118 rotates in the direction marked by the arrow B with the guide barrel 111 as its axis of rotation. At this time, the sliding ring 114, to which the two pin shafts 115 are fixed, is shifted in position, in the direction indicated by the arrow A, in parallel with the optical axis L, since the guide rollers 120 axially mounted on the pin shafts 115 are engaged with the pair of helicoidal slots 119 in the rotating ring 118, while the other guide rollers 116 axially mounted on the same pin shafts 115 are engaged with the guide slots 117 in the guide barrels 111.

Figure 18A:
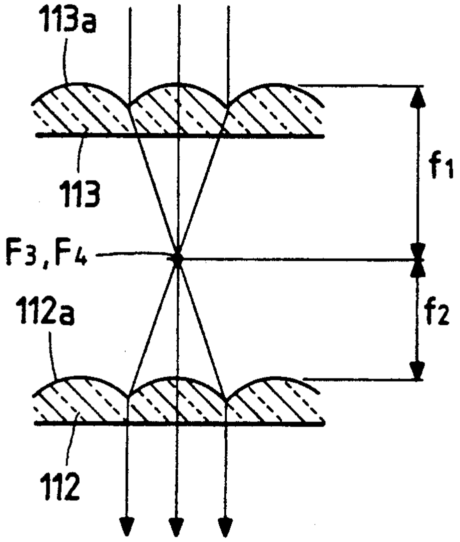
FIG. 18(*a*) and FIG. 18(*b*) are illustrative drawings showing the operation of the controlling lens system.
Figure 18B:
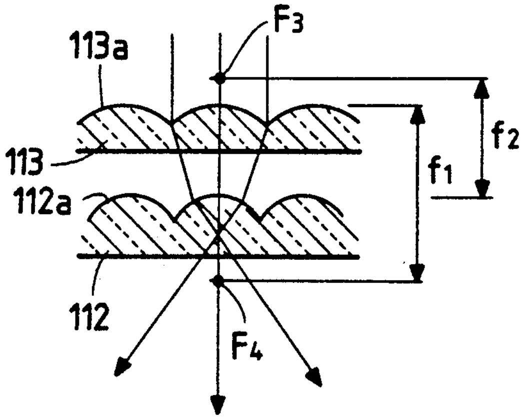
Figure 19:
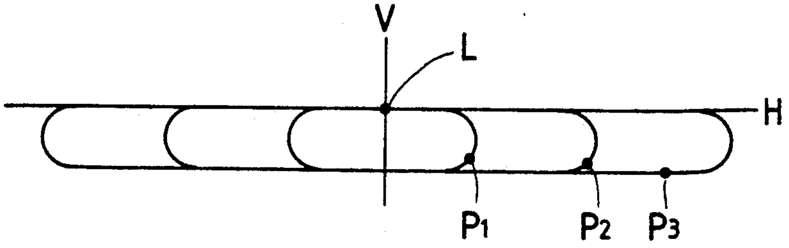
FIG. 19 is an illustrative drawing showing the patterns of a flux of irradiated light.

With this movement of the sliding ring 114, the movable lens 113 rigidly mounted on the sliding ring 114 undergoes a change in its distance to the stationary lens 112 in the direction of the optical axis L, setting the positional relationship of the focal lengths f2 and fl of the convex lens steps 112*a* and 113*a* of the two lenses 112 and 113 as illustrated in FIG. 18. This action shifts the pattern of the flux of irradiated light to what is shown in FIG. 19.

That is to say, in the case shown in FIG. 18(*a*), the guide roller 120 is engaged with the positioning step part 119*a* at the forward side of the helicoidal slot 119, and the movable lens 113 is thereby moved in such a manner that the focuses F3 and F4 of the lens steps 112*a* and 113*a* come into agreement. Thus, the flux of light incident upon the movable lens 113 from the projector lamp 101 is converged only in the width direction towards the focus F4 by the effect of the cylindrical convex lens step 113*a*, and is also made incident upon the cylindrical convex lens step 112*a* of the stationary lens 112 through the common focus F3. The flux of light which has passed through the stationary lens 112 forms a non-diffused light flux irradiating pattern P1 approximately in parallel with the optical axis L in the width direction.

In the case illustrated in FIG. 18(*b*), because the guide roller 120 is engaged with the positioning step part 119*c* on the forward side of the helicoidal slot 119, the movable lens 113 is moved to a position where the focuses F3 and F4 of the convex lens steps 112*a* and 113*a* of the two lenses 112 and 113 are not in agreement. At that time, the flux of light incident upon the movable lens 113 from the projector lamp 101 converges towards the focus F4 only in the width direction by the effect of the cylindrical convex lens step 113*a*, and the flux of light incident upon the cylindrical convex lens step 112*a* of the stationary lens 112 does not pass through the focus F3. After the flux of light has passed through the stationary lens 112, it forms a light flux irradiating pattern P3 in which the light is diffused in the width direction.

Therefore, it is possible to form a low diffusion pattern P1, a middle diffusion pattern P2, and a wide diffusion pattern P3 through the displacement of the movable lens 113 rigidly mounted on the sliding ring 114 by driving and controlling the DC motor 123 on the basis of the detected position input from the potentiometer 126. For example, the lens driving device can be operated so as to produce a predetermined light flux irradiating pattern on the basis of speed information fed from a speed sensor installed on the vehicle.

Figure 20:
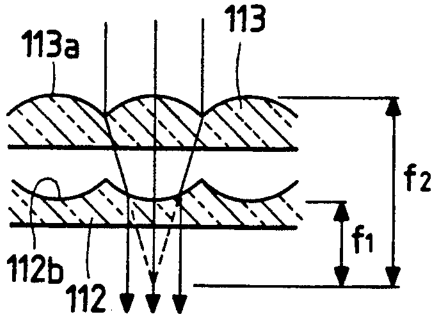
FIG. 20 is an illustrative drawing showing another controlling lens system of the invention.

The combination of the two lenses 112 and 113 shown in the above-described fourth embodiment includes the stationary lens 112 and the movable lens 113, both of which are composed of cylindrical lens steps formed into convex lenses. However, as shown in FIG. 20, the same operation can be performed with a combination of a stationary lens 112 having cylindrical concave lens steps 112*b* and a movable lens 113 having cylindrical convex lens steps 113*a*.

Figure 21:
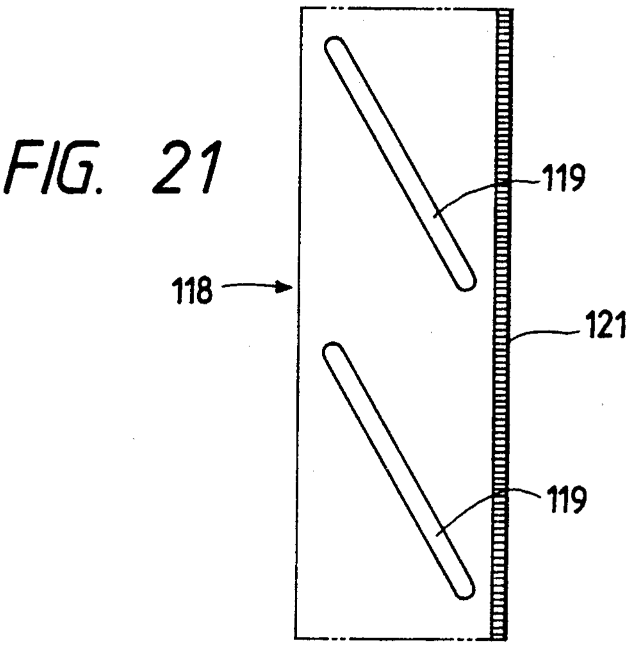
FIG. 21 is a developed drawing of the rotating ring showing the construction of other helicoidal slots.

Furthermore, the helicoidal slots 119 in the rotating ring 118 can also have a configuration wherein, as shown in FIG. 21, there are no positioning steps 119*a*, 119*b* and 119*c* so as to allow stepless control of the diffusion of the flux of irradiated light.

Figure 22:
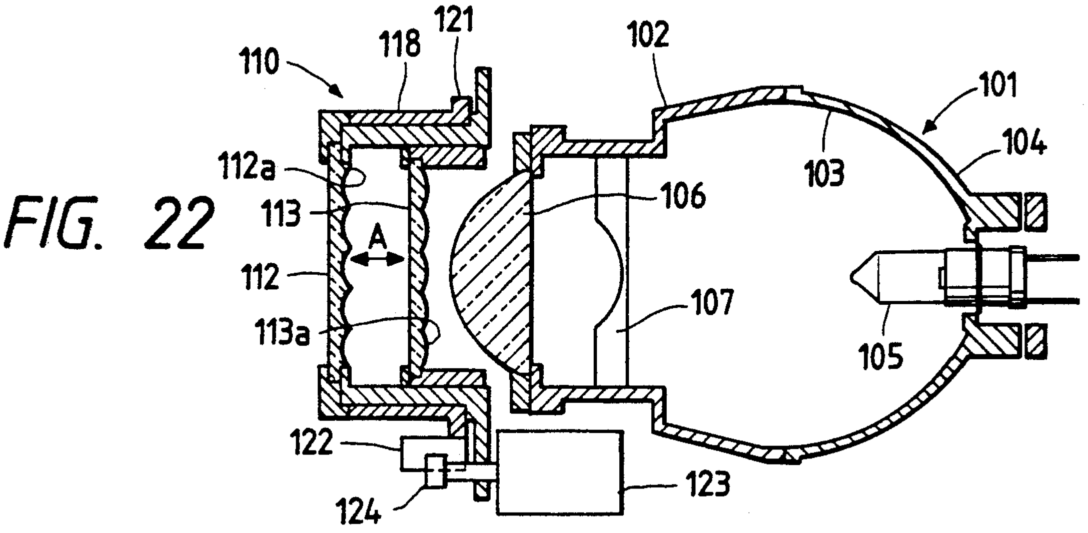
FIG. 22 is a plane sectional view illustrating a fifth preferred embodiment of a lens driving device according to the present invention.
Figure 23:
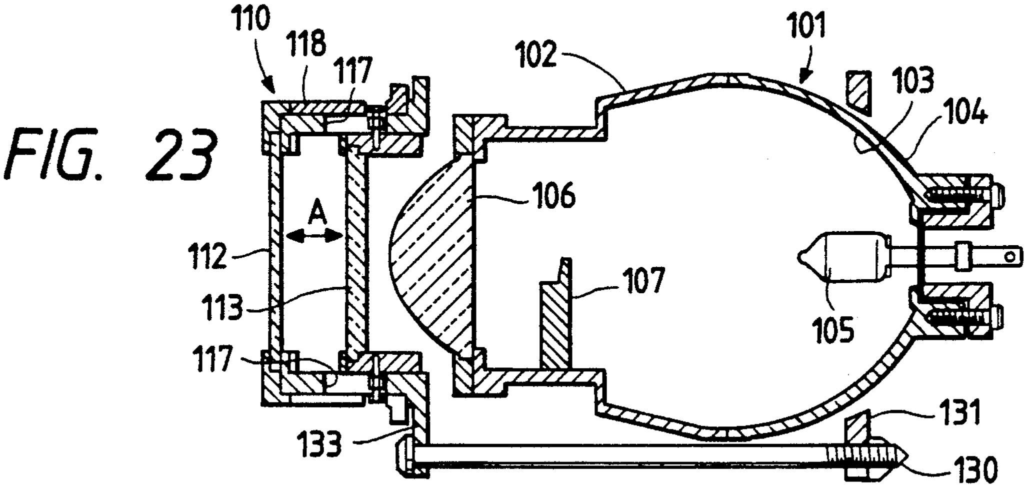
FIG. 23 is a side sectional view of the lens driving device of FIG. 22.
Figure 24:
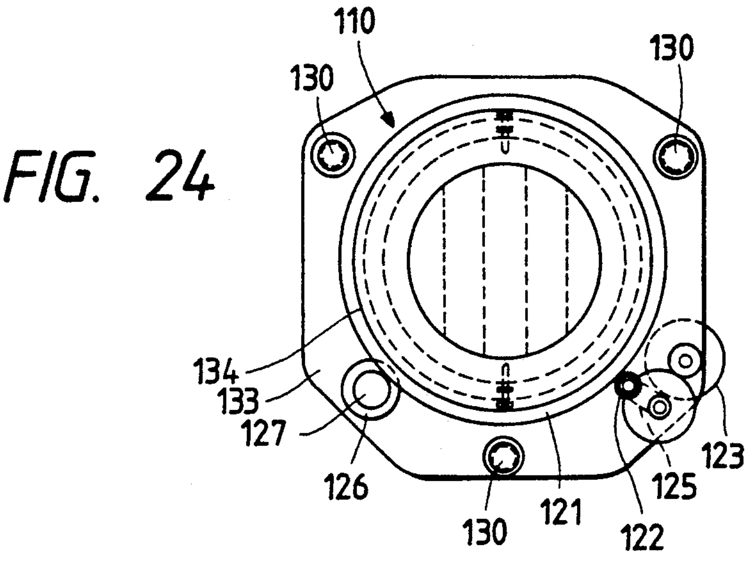
FIG. 24 is a front view of the lens driving device of FIG. 23.

FIG. 22 through FIG. 24 illustrate a fifth preferred embodiment of the present invention, in which the controlling lens system 110 is mounted in a separate unit on the optical axis forward of the casing 102 of the projector lamp 101. This controlling lens system 110 employs three supporting rods 130 which extend rearward, from the heteromorphic flange 133 of the controlling lens system 110 of the fourth embodiment described above, with the individual end parts of the supporting rods 130 being rigidly fixed to a frame 131 on which the projector lamp 110 is set in frame structure in a manner permitting its aiming operation. Also, in this embodiment, the lens system is configured with a combination of a stationary lens 112 formed with many cylindrical concave lens steps **112*b* placed side by side and a movable lens 113 formed with many cylindrical convex lens steps placed side by side, as seen in FIG. 20**.

Figure 25:
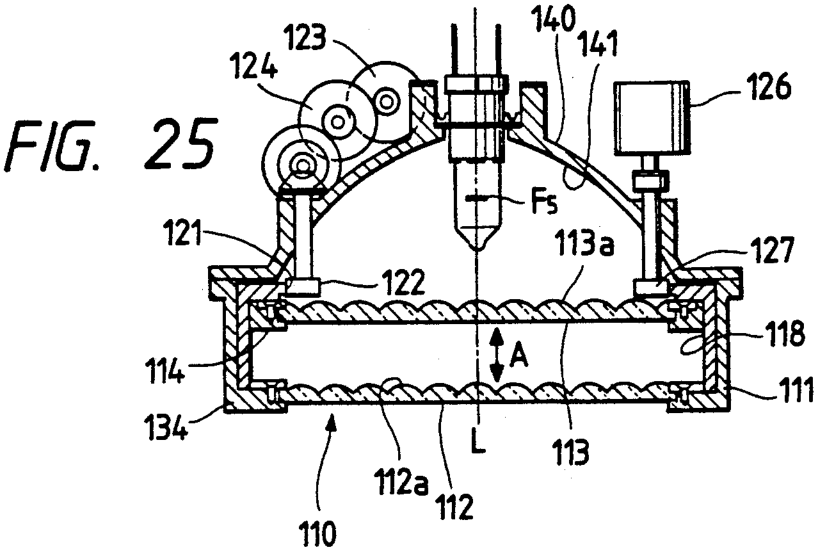
FIG. 25 is a plane sectional view illustrating a sixth preferred embodiment of a lens driving device according to the present invention.
Figure 26:
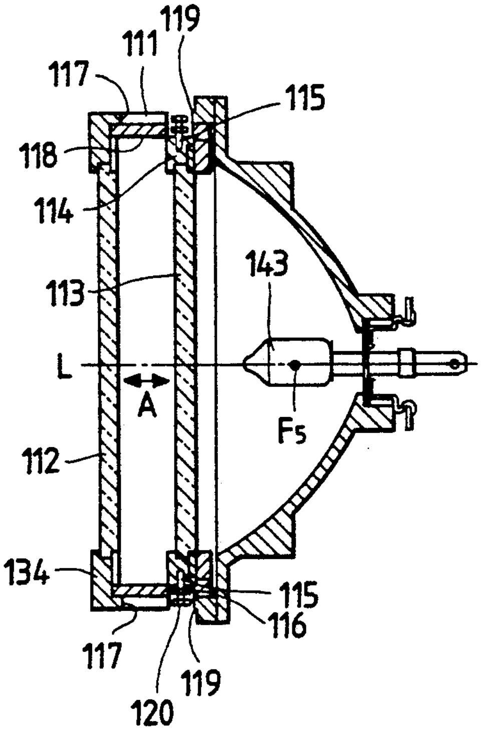
FIG. 26 is a side sectional view of the lens driving device of FIG. 25.
Figure 27:
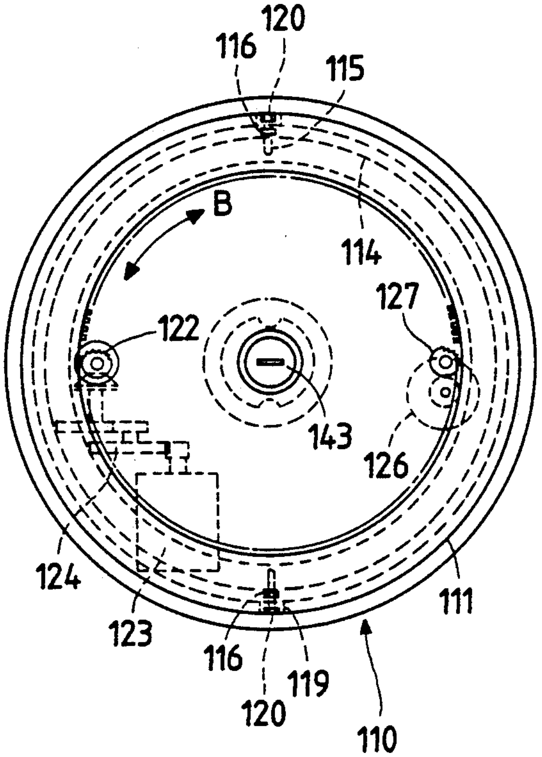
FIG. 27 is a front sectional view showing the lens driving device of FIG. 25 with a part thereof shown in cut-away.

FIG. 25 through FIG. 27 illustrate a sixth embodiment in which a parabolic reflector is used as a means of irradiating a flux of parallel light, and a controlling lens system 110 is rigidly mounted in the opening area of the reflector 140.

The reflector 140, which has a parabolic reflecting surface 141 having a focus F5, has a construction in which a bulb 143 is set at the position of the focus F5 on the optical axis L of the reflector 140, thereby to form a flux of irradiated light in parallel with the optical axis L.

The controlling lens system 110 is set in the cylindrically shaped guide barrel 111 rigidly mounted on the forward end of the reflector 140. The central axis of the guide barrel 111 is set in agreement with the optical axis L. Reference number 112 indicates a stationary lens tightly connected with a lens frame 134 fixed on the forward end of the guide barrel 111. The stationary lens 112 is constructed with many cylindrical convex lens steps **112*a* formed side by side in the lateral direction. Inside the guide barrel 111 is inserted a rotating ring 118, which is prevented from sliding in the axial direction but which is free to rotate (in the direction shown by an arrow B). The individual guide rollers 120, which are axially mounted in a manner permitting their free rotating motion on the middle part of the pin shafts 115 protruding from a sliding ring 114 (which will be described later) are inserted into a pair of helicoidal slots 119 formed in the barrel wall in a manner permitting their free sliding motion in the slot direction. Also, a ring gear 121 is formed on the inner circumference of an end part of the cylindrical body. Moreover, a cylindrically shaped sliding ring 114, on one end of which is mounted a movable lens 113 formed with cylindrical convex lens steps 113*a* at the same pitch and extending in the same direction as the lens steps 112*a* of the stationary lens 112, is inserted into the rotating ring 118 in a manner permitting its free sliding motion in the axial direction (as indicated by the arrow mark A). The guide rollers 116, which are axially mounted in a manner permitting their free rotation on the individual end parts of the pin shafts 115, are inserted, in a manner permitting their free sliding motion in the direction of the optical axis, into the guide slots 117 in the barrel wall of the guide barrel 111** extending parallel to the optical axis L. Thus, a detent structure is formed.

Reference number 122 indicates a driving gear which is axially mounted in a manner permitting its free rotation in relation to the reflector 140 and which is engaged with the ring gear 121. The driving gear is connected so as be rotated by the driving shaft of a DC motor 123 rigidly mounted on the reflector 140 by way of a rotation transmitting mechanism inclusive of a speed reducing gear 124. Moreover, a potentiometer 126, whose shaft is meshed with the ring gear 121 via a gear 127, detects the rotational position of the rotating ring 118, which is formed in a structure unified with the ring gear 121.

Figure 28:
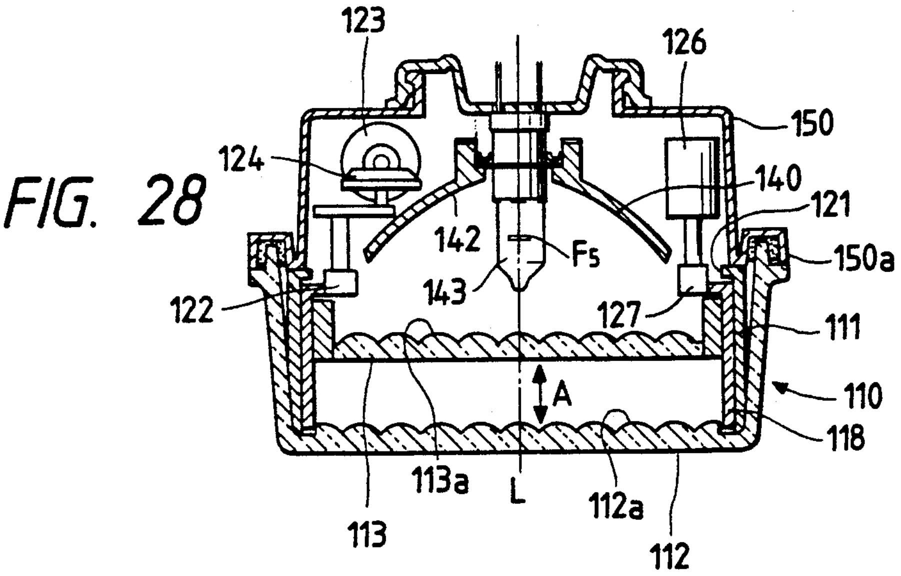
FIG. 28 is a plane sectional view showing a seventh preferred embodiment of a lens driving device according to the present invention.
Figure 29:
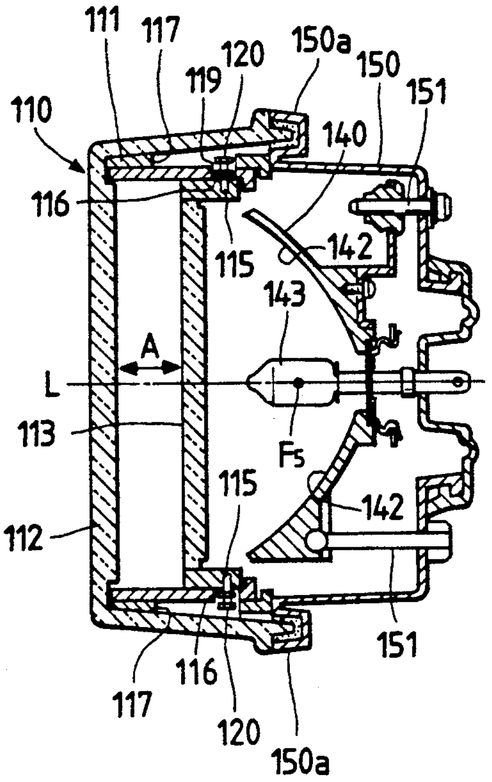
FIG. 29 is an approximate side sectional view of the lens driving device of FIG. 28.
Figure 30:
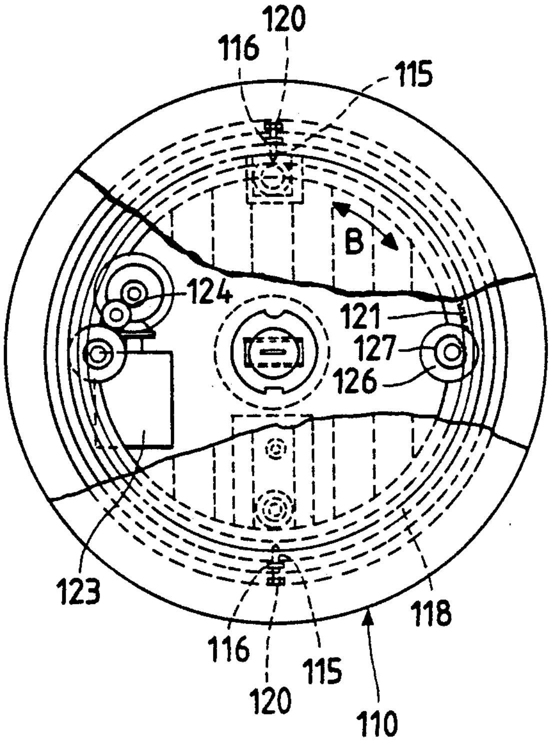
FIG. 30 is a front view of the lens driving device of FIG. 28 with a part thereof shown in cut-away.

FIG. 28 through FIG. 30 illustrate a seventh embodiment, in which a reflector with a parabolic surface is employed as a means of irradiating a flux of parallel light. The reflector 140 having the parabolic mirror surface 141 and a controlling lens system 110 are constructed in separate units.

That is to say, the reflector 140, which is housed in a casing 150, which forms a housing for the lamp, is supported by an aiming support mechanism 151. The reflector 140 is provided with a parabolic reflecting surface 142 having a focus F5. A bulb 143 is mounted at the position of the focus F5 on the optical axis L of the reflector 140.

The controlling lens system 110 is set in a frame structure in a cylindrically shaped guide barrel 111 mounted rigidly on the forward end of the casing 150. The guide barrel 111 has a central axis in agreement with the optical axis L. The base end part of a stationary lens 112 formed with many cylindrical convex lens steps **112*a* positioned side by side in the lateral direction is fixed in a setting groove 150*a* formed at the forward end of the casing 150. Inside this guide barrel 111, a rotating ring 118, which is prevented from sliding in the axial direction, is inserted in a manner permitting its rotational motion (as indicated by the arrow B). The individual guide rollers 120, axially mounted in a manner permitting their rotational motion on the middle parts of the pin shafts 115, are inserted, in a manner permitting their free sliding motion in the slot direction, in a pair of helicoidal slots 119 in the barrel wall. A ring gear 121 is formed on the inner circumference of the cylindrical body. Moreover, a cylinder-shaped sliding ring 114 with cylindrical convex lens steps 113*a* formed at one end thereof at the same pitch and in the same direction as the lens steps 112*a* on the stationary lens 112 is inserted, in a manner permitting its free sliding motion in the axial direction (as indicated by the arrow A), into this rotating ring 118. Guide rollers 116 axially mounted in a manner permitting their free rotational motion on the individual end parts of the pin shafts 115 are inserted, in such a manner as to permit their free sliding motion in the direction of the optical axis, into the guide slots 117 extending parallel with the optical axis L in the barrel wall of the guide barrel 111**, thus forming a detent structure against rotation.

Reference number 122 indicates a driving gear which is axially mounted in a manner permitting its free rotational motion in relation to the casing 150 and which is in engagement with the ring gear 121. The driving gear is connected so as to rotated by the driving shaft of a DC motor 123 rigidly mounted on the casing 150 by way of a rotation transmitting mechanism including a speed reducing gear 124. Moreover, the shaft of a potentiometer 126 rigidly mounted on the casing 150 meshes with the ring gear 121 via a gear 127. The potentiometer detects the rotational position of the rotating ring 118, which is formed in a structure unified with the above-mentioned ring gear 121.

The lens driving device of the present invention for use in a variable light distribution type automobile lamp according to the present invention has a construction in which a sliding ring and a rotating ring are respectively inserted into the inside and outside of a guide barrel, with the guide slots in the guide barrel and the helicoidal slots in the rotating ring being correlated by means of the pin shafts in a structure integrated with a sliding ring having a movable lens fixed thereon. Thus, the present invention offers an extremely simplified construction of the controlling lens system and has the characteristic feature that the lens driving device is capable of driving one of the lenses accurately along the optical axis, thereby achieving an extremely great practical effect in the actual implementation of the present invention.

What is claimed is:

1. A variable light distribution type automobile lamp comprising: a source of a substantially parallel flux of light; first and second lenses disposed in said flux of light, each of said first and second lenses each having formed therein a plurality of parallel cylindrical lens steps of equal pitch and a flat area, said flat areas being aligned with each other in said flux of light; and means for varying a spacing between said first and second lenses.

2. The variable light distribution type automobile lamp of claim 1, wherein said flat areas are formed in respective centers of said first and second lenses.

3. A variable light distribution type automobile lamp comprising: a lamp body; a source of a substantially parallel flux of light disposed within said lamp body; first and second lenses having a plurality of parallel cylindrical lens steps formed therein; a first frame fixed with respect to said first lens; a second frame fixed with respect to said second lens, said second frame being slidably and nonrotationally mounted with respect to said first frame, whereby a distance between said first and second lenses can be changed without rotating said first and second lenses with respect to one another; and means for translationally driving said second frame relative to said first frame.

4. The variable light distribution type automobile lamp of claim 3, wherein said first and second frames are rectangularly shaped, and said second frame is slidably mounted within said first frame.

5. The variable light distribution type automobile lamp of claim 4, wherein said first lens has leg portions fixed to a front portion of said lamp body, and said first frame is fixed to said lamp body within said leg portions of said first lens.

6. The variable light distribution type automobile lamp of claim 3, wherein said driving means comprises: a motor; a worm gear rotated by said motor; and a lens driving shaft fixed at one end to said second frame, said lens driving shaft having a rack formed in a rear portion thereof, said worm gear being engaged with said rack.

7. The variable light distribution type automobile lamp of claim 6, further comprising an intermediate shaft rotated by said motor, said worm gear being fixed to an end portion of said intermediate shaft.

8. The variable light distribution type automobile lamp of claim 6, further comprising an intermediate shaft rotated by said motor; and a intermediate gear fixed to said intermediate shaft, said worm gear being rotated by said intermediate gear.

9. The variable light distribution type automobile lamp of claim 7, further comprising a potentiometer, and a gear for driving said potentiometer fixed to said intermediate shaft.

10. The variable light distribution type automobile lamp of claim 3, wherein said source of said flux of light comprises a reflector disposed within said lamp body.

11. The variable light distribution type automobile lamp of claim 3, wherein said source of said flux of light comprises a projection lamp disposed within said lamp body.

12. The variable light distribution type automobile lamp of claim 3, wherein said first and second frames are cylindrically shaped, and further comprising a guide barrel fixed to said lamp body, said first frame being fixed to a forward end of said guide barrel, said second frame being slidably and nonrotationally mounted by said guide barrel.

13. The variable light distribution type automobile lamp of claim 12, wherein said guide barrel has formed therein at least one guide slot extending parallel to an optical axis of said flux of light, and further comprising a pin shaft fixed to said second frame and extending through said guide slot, said driving means engaging a head portion of said pin shaft for translationally driving said second frame relative to said first frame.

14. The variable light distribution type automobile lamp of claim 13, wherein said driving means comprises ring gear means rotationally fitted around said guide barrel, said ring gear means having a helicoidal slot formed therein, a head portion of said pin shaft being received in said helicoidal slot, a motor, and means for transmitting rotational movement of said motor to rotational movement of said ring gear means.

15. The variable light distribution type automobile lamp of claim 14, wherein said helicoidal slot is linear.

16. The variable light distribution type automobile lamp of claim 14, wherein said helicoidal slot has a stepped configuration.

17. The variable light distribution type automobile lamp of claim 14, wherein said rotational movement transmitting means comprises a speed reducing gear rotated by a shaft of said motor, a driving gear engaged with said ring gear means, and an endless belt entrained between said speed reducing gear and said driving gear.

18. The variable light distribution type automobile lamp of claim 14, further comprising a guide roller on said pin shaft and received in said helicoidal slot.

19. The variable light distribution type automobile lamp of claim 12, further comprising a potentiometer having a shaft rotated by said ring gear means.

20. The variable light distribution type automobile lamp of claim 14, wherein said source of said light flux comprises a projection lamp.

21. The variable light distribution type automobile lamp of claim 14, wherein said source of said light flux comprises a parabolic reflector formed integrally with said lamp body.

* * * * *